United States Patent [19]

Gopal

[11] 4,258,696

[45] Mar. 31, 1981

[54] PASSIVE THERMAL ENERGY PHASE CHANGE STORAGE APPARATUS

[75] Inventor: Raj Gopal, Brown Deer, Wis.

[73] Assignee: Johnson Controls, Inc., Milwaukee, Wis.

[21] Appl. No.: 893,259

[22] Filed: Apr. 5, 1978

[51] Int. Cl.³ .......................... F24H 7/00; F28D 13/00
[52] U.S. Cl. .................................. 126/400; 126/430; 165/104 S
[58] Field of Search ............... 126/270, 271, 400, 430, 126/436; 165/104 S, DIG. 4, DIG. 18

[56] References Cited

U.S. PATENT DOCUMENTS

| | | | |
|---|---|---|---|
| 2,827,438 | 3/1958 | Broadley | 126/400 |
| 3,952,519 | 4/1976 | Watson | 126/400 |
| 4,117,882 | 10/1978 | Shurcliff | 126/400 |

Primary Examiner—Samuel Scott
Assistant Examiner—G. Anderson
Attorney, Agent, or Firm—Andrus, Sceales, Starke & Sawall

[57] ABSTRACT

A passive thermal energy storage cell includes a container formed of suitable material. The container is filled substantially with a supercoolable material such as ethylene carbonate or a phase change material for storage of solar energy or the like. The container includes mechanical passive nucleating elements such as sharp pointed asperities on the wall, cold fingers or pointed members secured within the tank in continuous activating engagement with the supercoolable material to prevent supercooling thereof. Exchange elements are coupled to the supercoolable material for introduction of heat from a solar collector and removal of heat to a load. The material may be heated by the solar energy to or above melting temperature to store heat. The passive nucleating elements tend to continually activate the supercoolable liquid such that substantially at or close to the melting temperature the material is triggered from a number of points or location, thus undergoing a transformation from a liquid to solid state, attaining its melting temperature and releasing the heat of fusion to the heat withdrawal element. The heat withdrawal continues until equilibrium temperature conditions are established. The heating and cooling of the liquid also results in the movement of the liquid over the nucleating element to further enhance the nucleation process.

16 Claims, 4 Drawing Figures

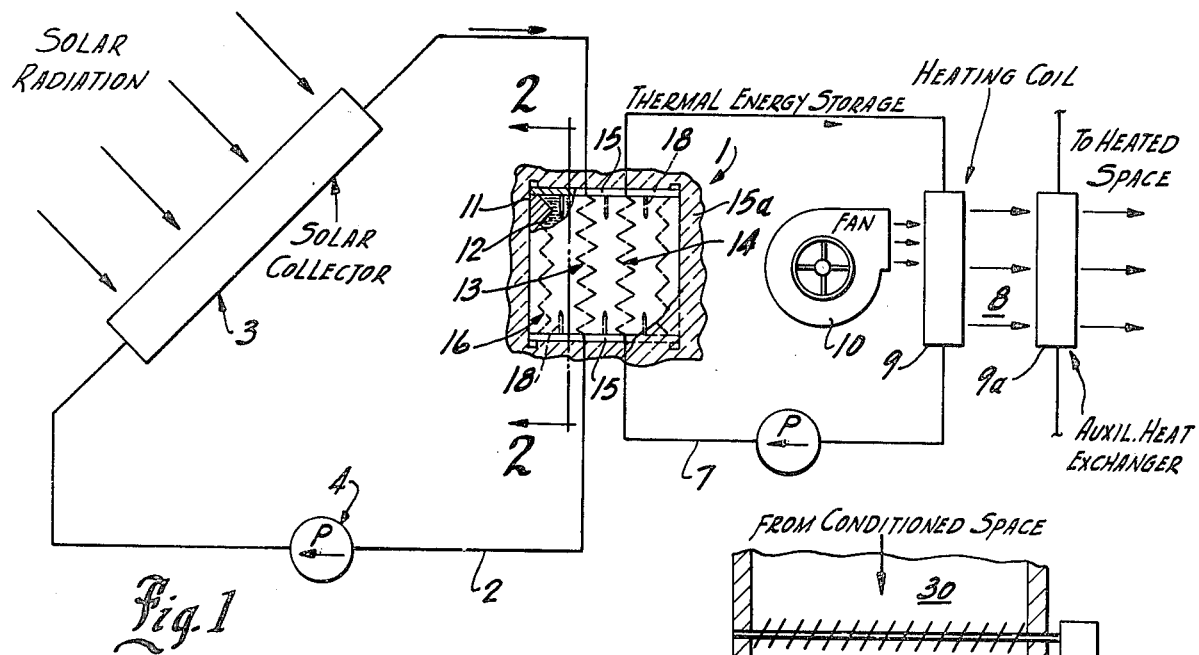
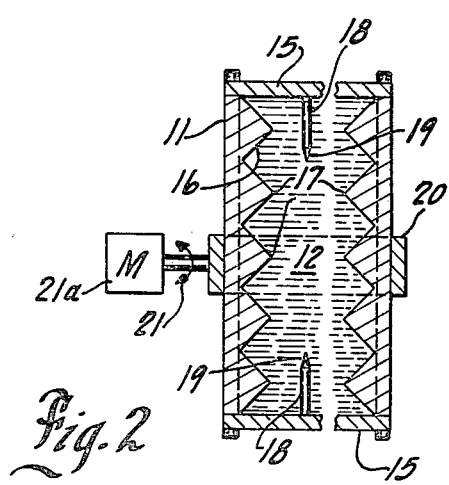
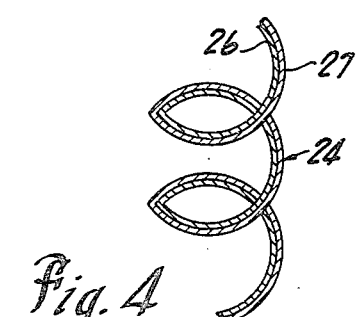
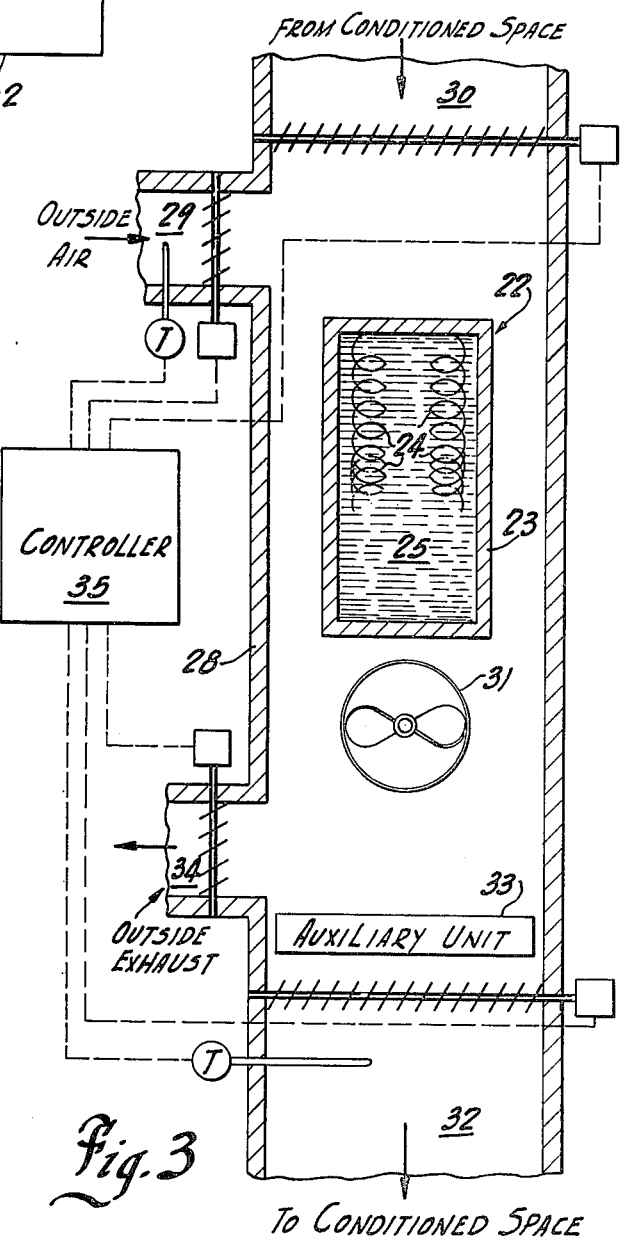

PASSIVE THERMAL ENERGY PHASE CHANGE STORAGE APPARATUS

BACKGROUND OF THE INVENTION

This invention relates to a passive thermal energy storage apparatus storing thermal energy in the form of heat of fusion.

Energy storing systems have been suggested to permit storage of the thermal energy from a suitable source during low peak usage periods or when such energy is available for subsequent use as necessary and, particularly, for storage of solar energy and the like. Energy storing systems may, of course, also be employed for cooling purposes where the cool night air, cool water or the like is employed as the cooling energy source.

Energy storage systems have employed various materials for storage of the energy, such as (1) solid or packed bed storage, (2) liquid storage and (3) phase change storage.

The packed bed storage system may employ rocks or the like, which have the disadvantage of large volume or space requirement. Liquid storage systems widely employ water as the thermal energy storage medium, which have the disadvantage of requiring relatively high temperature collector sources because the heat is stored only as sensible heat in the storage medium.

Phase change systems use salt hydrates, such as sodium sulphate decahydrate, also generally known as glauber salt, or pentahydrate as the storage medium. The hydrates turn to a liquid when heated and freeze into crystals when cooled to its melting temperature. In one system, the salt is held in a continuously rotating tank with a dynamically controlled means for introducing seed crystals into the tank to initiate the crystallization. The tank is continuously rotated to maintain a uniform water and salt mixture and a bath temperature which is close to wall temperature to prevent undesirable built upon portions of the tank wall rather than at the nucleation center when the seed crystal is introduced. In addition, temperature monitoring or other control means are employed to initiate the nucleation at or below the normal melting temperature. Although such salt has been employed for storage because the storage capacity is substantially greater than water or the like, other phase change materials and associated dynamically controlled release mechanisms have also been suggested.

Improved thermal energy storage systems employing other supercooled storaged mediums in which the energy is stored has been suggested. For example, dynamically controlled and triggered supercoolable material storage systems are also shown in U.S. Pat. No. 3,093,308, which issued to Charles D. Snelling on June 11, 1963 and U.S. Pat. No. 3,952,519, which issued to William K. R. Watson on Apr. 27, 1976. A highly satisfactory triggered system is disclosed in the application of Paul E. Thoma for THERMAL ENERGY STORAGE APPARATUS, filed on Nov. 24, 1976, with Ser. No. 744,695. Generally, in the prior art systems, a supercoolable material is contained within a suitable housing or container in combination with a triggering means for selectively introducing a nucleating device or means into the liquid. The supercoolable material is selected to have a supercooled liquid state and temperature well below the ambient storage temperature. The material is heated to its melting temperature to form a liquid body above the melting temperature. The liquid body may then be allowed to cool to a temperature below the melting temperature, that is to the temperature of the surrounding environment. As the supercoolable liquid cools below the melting temperature, it does not freeze or change state but rather supercools in the liquid state to the temperature of the surroundings, or a higher temperature depending upon the insulation about the container. In the supercooled state, the liquid stores thermal energy as the heat of fusion of the supercoolable liquid. To recover such heat, it is merely necessary to nucleate the liquid, thereby causing a rapid freezing or solidification with a corresponding liberation of the heat stored therein. The material is such that when in the supercooled liquid state, solidification or freezing can be initiated by use of a nucleating device such as a cold finger, a seed crystal, or a sharp pointed object.

Although such dynamically controlled systems provide a means for effective storage of substantial quantities of thermal energy, the systems generally present practical constructional and operational difficulties which have limitedpractical and extensive usage and which has resulted in an on-going investigation and study of improvements and alternatives of such systems.

SUMMARY OF THE INVENTION

The present invention is particularly directed to an improved thermal energy storage system employing a supercoolable medium for storage of thermal energy.

In accordance with the present invention, the supercoolable material is confined within a tank or container means including an internal passive nucleating means mounted within the supercoolable material to create a self-contained passive supercooling suppressant system. The nucleating means may include any internal passive elements such as an internal surface with a substantial number of sharply pointed asperities, pointed rods, or the like. The multiple passive elements, thus eliminate any significant supercooling and promote the freezing and crystallization of the liquid whenever it is at or slightly below the melting temperature to provide a continuously available heat source for use during a heating cycle. As the liquid expands and contracts incident to the change in temperature, the movement over the passive element should further promote the nucleation. This action may be further enhanced by providing a slight tilting of the container to cause the material to flow or by forming of the passive elements of a bimetal or the like to create a continuously minor or slight relative movement between the liquid and the passive nucleating elements. In a particularly unique construction, the supercoolable material may be selectively coupled to a solar energy collector for heating of the supercoolable material and to a heat exchanger for recovery of the stored thermal energy. A separate heat transfer medium may be circulated through the collector and the supercoolable material for heating of the latter. The heat may be withdrawn in a similar transfer system.

In the broadest aspects of this invention, the present invention may, in addition to usage in a heating system, also be employed in a cooling system. The storage material, in this aspect of the invention,is selected generally as a mixture of supercoolable materials to have a spontaneous freezing temperature at the expected available cold temperature source, such as nighttime air, a cold water source or the like. The material can be selected to have a well defined melting temperature. During periods when cooling energy is required, the transfer medium is passed through or over the storage material to heat the material and cool the transfer medium.

The present invention provides a passive thermal energy storage unit for storing of the thermal energy with a self-contained supercooling suppressant means to provide a cost effective system, either as a heating storage source or as a cooling storage source.

BRIEF DESCRIPTION OF THE DRAWING

The drawing furnished herewith illustrates a preferred construction of the present invention in which the above advantages and features are clearly disclosed as well as others which will be readily understood from the following description.

In the drawings:

FIG. 1 is an illustration of a thermal storage energy unit constructed in accordance with the present invention and incorporated in a solar energy heating system;

FIG. 2 is an enlarged sectional view through the energy storage unit shown in FIG. 1;

FIG. 3 is a view similar to FIG. 2 of an alternative embodiment of the invention; and FIG. 4 is an enlarged fragmentary view of an element of FIG. 3.

DESCRIPTION OF THE ILLUSTRATED EMBODIMENT

Referring to the drawing, the illustrated embodiment of the invention, shown in FIGS. 1 and 2, includes a thermal energy storage cell or unit 1 constructed in accordance with the teaching of the present invention and connected in a solar heating system. An embodiment of the invention wherein a cell or unit 1 may be employed as a cold energy storage means is shown and described with respect to FIG. 3. The cell 1 is connected by a heat input line 2 which is connected to circulate a heat exchange medium, such as water, from solar collector 3 through the unit 1 for supplying of thermal energy into unit 1 for storage. The embodiment of FIG. 1 could, of course, employ air or the like for transfer of the thermal energy. Such a system is also shown in the embodiment of FIG. 3 and the adaptation of the particular transfer system will be readily provided by those skilled in the art. The present invention is particularly directed to the cell or unit 1 and the transfer mechanism is therefore only briefly described and schematically shown herein. A heat transfer pump 4 may, for example, circulate a suitable liquid through the collector 3 and unit 1. The thermal energy storage cell 1 is similarly connected to a heat output line 7 for selective withdrawal of thermal energy, in accordance with any suitable automatic or manual control, to a heat load system 8. For example, the heating or load system 8 may be a part of a space heating system for conditioning the room air and include a heat exchanger 9 connected to the storage cell 1 and a second heat exchanger 9a connected to an auxiliary heat source such as a boiler, a hot air furnace or the like, not shown. Thus, the heating system 8 may first rely on the solar heating system for heat, and when exhausted, the auxiliary unit 9 to supply the necessary heating. As associated fan 10 provides for movement of air over the exchangers 9 and 9a and to the conditioned space.

Generally, in accordance with the illustrated embodiment of the invention, the thermal energy storage cell 1, which is shown in simplified illustration for purposes of clearly disclosing an embodiment of the invention, includes a large container or tank 11 in which a supercoolable material 12 is confined. For example, the tanks 11 may readily be on the order of 1000 gallons. In this embodiment, exchange conduits 13 and 14 are mounted within the container 11 passing through the supercoolable material 12 and respectively connected to the heat transfer lines 2 and 7 for circulation of the respective transfer liquid or other mediums through the nucleated supercooled material 12.

Container 11 is shown as a suitable metal tank having removable end covers 15, through which the exchange conduits pass for connection in the heat input system and heat output system. The container is somewhat larger than the volume of the material 12 when heated. The heated liquid 12 is thus free to move within the container, as subsequently described. The container 11, with the internal exchange conduits, may be enclosed in suitable insulation 15a to minimize excessive heat losses but need not be such as to prevent the container 11 and confined material 12 from dropping to or slightly below the melting temperature during the period of thermal energy withdrawal.

The present invention, as noted above, is particularly directed to the storage means. The solar collector 3, the liquid heat exchange system, 8 associated pumps and controls and interconnecting systems are, therefore, diagrammatically illustrated and no further description of particulars is other than to clearly explain the illustrated embodiment of the present invention. Similarly, an air-to-air system is shown in FIG. 3 and correspondingly described.

The material 12 may be of any suitable supercoolable material which, as more fully disclosed in the previously identified copending application, is capable of being placed and maintained in a solid state to a given melting temperature level and alternately in a liquid state upon reaching such temperature level. Further, material 12, when cooled in the liquid state to below its melting temperature but above a spontaneous freezing temperature, maintains the liquid state in the absence of any form of nucleation in contact with the material. This latter condition is identified as the supercooled state. Supercooling of the liquid to a particular level identified as the spontaneous nucleating temperature results in spontaneous freezing and solidification of the material, with a resulting release of the heat stored in the liquid.

The supercooled liquid 12, as discussed in the prior art, is also capable of being triggered into freezing or fusion while above the spontaneous nucleating temperature and below the melting temperature by initiating solidification at a point of limited area. Various means of selective and controlled activation are disclosed in the previously identified prior art to provide controlled or dynamic heat transfer system. For example, the nucleating device may be a cold or sharp element, which is external to the material container, a separate seed crystal or other separate means which is constructed and arranged with a separate control system for introducing of such device into the material to initiate and trigger the process at a particular time or condition, which process should then rapidly propagate through the entire mass. The supercooled liquid therefore is triggered into nucleation from movement or introduction of the initiating means. The material rises to the melting temperature if sufficient energy is present. However, the supercooled liquid cannot be heated above its melting temperature. Consequently, during its rise to the melting temperature and subsequent transfer to the solid form, the material releases its stored heat of fusion.

In accordance with the teaching of the present invention, the unit 1 is constructed with a total passive activator including a internal passive means 16 within the container 11 to continuously activate the supercoolable liquid 12 up to or slightly below the melting temperature and thereby initiate the crystallization and solidification process.

In operation of the system, the solar collector 3 is coupled to unit 1 to heat the material 12 to above the melting temperature; thereby melting the solid material to a liquid and further heating of the liquid to a temperature above its melting temperature. Thus, during the daylight hours the material is in a liquid state and will normally be above the melting temperature. When heat is required, the heat transfer pump is operated and heat is withdrawn by the transfer medium. The liquid then cools if above melting temperature and generally will cool to or slightly below its melting temperature.

With any temperature state slightly below the melting temperature, either as a result of heat transfer to system 8 or as a result of natural cooling, the internal nucleating designed devices 16 automatically trigger the supercooled liquid which nucleates and starts freezing; liberating the heat of fusion and producing a timed release of thermal energy and preventing of the actual supercooling. If the pump unit is operating, heat is transferred to the system 8 and particularly the heat transfer unit 9. Thus, the multiple passive means within the container 11 are continuously operative with the material 12 below the melting temperature. The liquid passing through the transfer conduit 14 absorbs this liberated heat and transfers it to the system 8 and particularly to the exchanger 9. Thus, in the illustrated embodiment, the solar system and the auxiliary system provide the total heat system. The solar energy storage unit 1 is constructed to establish and provide a heat source for rapid and efficient transfer to the exchanger 9. When such heat is exhausted, the auxiliary system may be activated.

Thus, in accordance with this invention, the container for the supercoolable material uniquely incorporates the continuously operative passive nucleating mechanism or device 16 to suppress the possible supercooling of material 12 for proper functioning of the cell. In the embodiment of FIGS. 1 and 2, the inner surface of the container 11 is uniquely constructed with a substantial plurality of sharp or pointed asperities 17. As noted previously, supercooled liquids are triggered into nucleation by a sharp pointed object. The sharp asperities 17 on the inner surface of the container 11 thus constitutes a nucleating means which generates continuous nucleating and freezing of the liquid. The asperities may be further modified by coating the tips with powdered metal, not shown, to define further sharp edges in the material 12. In addition, in FIGS. 1 and 2, sharply pointed rods or wires 18 are secured to the covers or end walls 15 and extending inwardly into the liquid 12. The rods are formed of stainless steel or any other compatible material and the ends of rods 18 are sharply pointed as at 19 and thus function as additional nucleating initiation centers. The rods 18 by proper selection may also function as promoters of thermal properties of the storage medium and further aid in the heat exchange process. Thus, the passive nucleating elements 17 and 18 may be formed in any desired manner, and the elements 17 and 18 are shown for purposes of illustration. For example, if the storage tank were formed of a plastic having a highly smooth inner wall, a powdered metal such as tungsten carbide could be deposited on the inner wall to define a substantial plurality of nucleation centers. The powdered metal may even advantageously be applied to the illustrated elements to create a great multiplicity of sharp or jagged surfaces in continuous contact with the material 12.

Material 12 expands on heating and contracts upon cooling. The material 12 which is generally either absorbing or giving up thermal energy is under a continuous state of movement over the asperities which further assists the nucleation process.

Further, the container 11 may be placed in an inclined position or even mounted in suitable rotatable support 20 and tilted back and forth, as shown at 21, to create flow over the asperities 16. The support 20 may include any suitable drive means such as an electric motor 21a. The supercoolable material 12 may be any of the known materials.

Ethylene carbonate, is a particularly convenient, relatively non-toxic and satisfactory material. A representative sample of the carbonate has a melting temperature of about 97.5° F. and can be readily nucleated by passive means. The carbonate also has a heat of fusion, being on the order of 61.2 BTU/lb and a relatively high volumetric capacity of 183 cu. ft/$10^6$ BTU of storage. The carbonate has a heat capacity of about 0.321 BTU/lb./°F. in solid form and about 0.363 BTU/lb/°F. in the liquid state. These and other significant properties of ethylene carbonate of Jefferson Chemical of Houston, Texas, are set forth in the Appendix attached to this specification. Other known materials include phenyl sulfoxide, benzophenenone and phenyl salicylate (Salol), ethylene trithiocarbonate as well as those discussed in the previously identified prior art.

As also disclosed in the literature published by Jefferson Chemicals, mixtures of supercoolable materials such as ethylene carbonate and propylene carbonate have well defined freezing points or temperatures which are dependent upon the relative levels or quantities of the materials in a mixture. This permits the ready adaptation and usage of the present invention, for both heating and cooling systems; that is, cell or unit 1 may be employed by proper selection of the storage material as a hot energy source or a cold energy source. A graphical illustration is shown in the Appendix of the change in freezing point for progressive changes in mixtures of ethylene carbonate and propylene carbonate. For example, for a cold storage system, the cell or unit 1 would be filled with a mixture having a freezing temperature at or slightly above the anticipated temperature of the cold source, such as ambient air, low temperature liquid such as well water, lake or ocean water and the like. Such a system will be described in connection with the embodiment of the storage cell shown in FIG. 3.

FIGS. 3 and 4 illustrate another embodiment of a storage unit 22 including a container 23 and an alternate passive nucleating element 24 projecting through the container and thus within the container supercoolable material 25. The elements 24 thus function as nucleating means. Each element 24 is a coiled element formed of superimposed metal members 26 and 27 to form a bimetal element. The metal members 26 and 27 are selected to have distinctly and substantially different thermal coefficients of expansions and contractions. The changes in the temperature of material 25 cause the elements 24 to continuously expand and contract. This creates an essentially continuous small scale agitation of the liquid material which enhances and promotes the reliable nucleation of the material 25, particularly during a discharge cycle with the material approximately at its melting temperature.

The unit 22 of FIGS. 3 and 4 functions essentially as the unit 1 of the first embodiment, as a passive, self-contained suppressed supercooled storage means. The unit thus provides a rather relatively simple and inexpensive means of storing and releasing thermal energy such as solar energy. As noted above, the cell may be connected as a cold source as well as a hot source of energy.

In FIG. 3, the storage cell 22 is shown mounted as a part of an air-to-air heat exchange system, and is first particularly described in an air cooling system. Thus, referring to FIG. 3, the cell 22 is shown mounted within a suitable air duct 28. The container is not insulated but is rather formed of material having a high thermal conductivity to establish rapid transfer of thermal energy between material 25 and the air in duct 28. The inlet side of the duct 28 includes a first dampered inlet opening 29 connected to outside air and a second dampered inlet opening 30 to the conditioned space. A fan 31 is shown mounted downstream of the cell 22 and draws air from openings 29 and/or 30 over the cell 22 before discharging the air through a dampered outlet opening 32 into the conditioned space. An auxiliary cooling unit 33 is shown mounted within duct 28 for operation when cell 22 is exhausted. A dampered exhaust or by-pass outlet opening 34 to the outside is also provided immediately downstream of fan 31 for circulating of cooling air over cell 22 during the period of the cool energy storage cycle, and cooling demand is not received from the conditioned space.

Generally, in operation, during the nighttime when outside ambient air is relatively cold, the openings 29 and 33 are opened. Thus, the several dampered openings having any suitable powdered damper units 34, as diagrammatically illustrated. The units are connected to a suitable controller 35 which also is connected to suitable outside air and space air temperature detectors 36 to selectively open and close the damper units for automatic and proper air movements. Various factors may be used to control the air flows and mixtures. For purposes of description, a highly simplified system and sequence is described. The fan 31 is also operated to pass the outside air over the cell 22 and discharges it from outlet 34. The mixture in cell 22 is selected to have a freezing temperature slightly above that of the nighttime ambient air and, consequently, the material freezes. Thus, as shown in the Appendix, the material mixture can be selected within a large range of temperatures and thus the proper material is used.

During the subsequent late nighttime or daylight periods, the ambient air temperature rises and the controller operates to close dampered openings 29 and 34. When a space cooling demand is created, the controller functions to open dampered openings 30 and 32 and start fan 31 to circulate space air through duct 28 and over the cell 22. The warm space air in passing over cell 22 gives up its heat content to the material 25 within the container 22, and is thus cooled before being discharged back into the conditioned space.

The very same cell may, of course, be employed for heating but generally would include a different mixture or single supercoolable liquid for material 25. If desired, such a combined system could employ a separate storage unit for the material not being used with an automatic or other interchange system. Alternatively, separate cells could, of course, be provided.

The embodiment of FIG. 3 when employed as a heating source would, of course, have the duct 28 coupled to a suitable hot air supply during appropriate periods for heating of unit 22 to store thermal energy. Thus, solar collectors employing an air collection means are well-known and could be connected to the dampered inlet opening 29 for supplying of heat to cell 22. Upon demand, the relatively cool space air would then be circulated over the cell 22 to absorb the heat from material 25.

The air-to-air system is desirable because of the simplification permitted in construction of cell 22. Thus, the container 22 may be a complete closed and sealed member, without the complication created by introduction of internal heat exchange conduits and the like, such as in the first embodiment.

The projecting rods 18 of the first embodiment and the elements 24 of the second embodiment also function as heat transfer elements within the supercoolable material. In certain materials, it is desirable to promote a more rapid formation of a uniform temperature condition. Further, the continuous action of elements, such as elements 24, would be useful in phase change systems in which the mixture should be continuously acted upon to promote the uniformity of the mixture.

As previously discussed, ethylene carbonate is a particularly satisfactory material. Although its thermal conductivity is reasonably good, it is quite moderate compared, for example, to salt hydrates which have been suggested as particularly useful as a thermal storage material. The projecting nucleating elements may be designed with appropriate thermal properties to improve the heat transfer throughout the material and thereby enhance the thermal efficiency of the unit.

The present invention avoids the necessity of complex nucleating control systems as well as other special dynamic controls and as such may be readily and conveniently constructed. The present invention thus provides a simple passive heat storage and transfer having a large and efficient storage and transfer of the energy.

TABLE 1*

APPENDIX
PASSIVE THERMAL ENERGY PHASE CHANGE STORAGE APPARATUS
RAJ GOPAL
Physical Properties of Ethylene Carbonate Ethylene carbonate is an odorless, colorless, low melting solid. It is not hygroscopic and is not corrosive. The physical properties of a representative sample are as follows.

|  | SI Units | English Units |
|---|---|---|
| Melting Point | 35.4° C. | 97.5° F. |
| Heat of Fusion | 34 cal/gm | 61.2 BTU/lb |

TABLE 1*-continued
APPENDIX
PASSIVE THERMAL ENERGY PHASE CHANGE STORAGE APPARATUS
RAJ GOPAL
Physical Properties of Ethylene Carbonate Ethylene carbonate is an odorless, colorless, low melting solid. It is not hygroscopic and is not corrosive. The physical properties of a representative sample are as follows.

|  | SI Units | English Units |
|---|---|---|
| Density: Solid | 1426 kg/m, 20° C. | 89.02 lbs/ft, 68° F. |
| Liquid | 1330 kg/m, 40° C. | 83.03 lbs/ft, 104° F. |
| Volume of Media/$10^6$BTU Storage | 5.18 m$^3$ | 183 ft |
| Specific Heat: Solid | 0.321 cal/gm°C., 15° C. | 0.321 BTU/lb/°F., 59° F. |
| Liquid | 0.363 cal/gm°C., 50° C. | 0.363 BTU/lb/°F., 122° F. |
|  | 0.461 cal/gm°C., 100° C. | 0.461 BTU/lb/°F., 212° F. |
|  | 0.479 cal/gm°C., 150° C. | 0.479 BTU/lb/°F., 302° F. |
| Thermal Conductivity |  |  |
| Liquid: | 49.3 × $10^{-5}$ cal/sec/cm°C. at 41° C. | 0.1192567 BTU/hr/ft°F. at 106° F. |
|  | 50.2 × $10^{-5}$ cal/sec/cm°C. at 97° C. | 0.1214333 BTU/hr/ft°F. at 207° F. |
| Boiling Point (760mm) | 248° C. | 478.4° F. |
| Heat of Combustion | 2662 cal/gm | 4788 BTU/lb |
| Flash Point (open cup) | 160° C. | 320° F. |
| Spontaneous Nucleation Temperature | 15.5° C. | 60° F. |
| Clarity of 100% Material | Melt Shall be Clear |  |
| Suspended Matter | Substantially Free |  |

*Various portions of Table 1 are based upon the "Ethylene Carbonate" Technical Bulletin of Jefferson Chemical, a subsidiary of Texaco Corp., Houston, Texas. Table 2 on Page 19 hereof, is based on their "Propylene Carbonate" Technical Bulletin.

TABLE 2
APPENDIX (continued)
Physical and Chemical Properties of Propylene Carbonate Propylene Carbonate is an odorless, colorless, mobile liquid. It is stable, not corrosive. Some physical and chemical properties of typical material are as follows:

| | | |
|---|---|---|
| Freezing point, °C. | | −49.2 |
| Boiling point, °C. | | 241.7 |
| Purity | | >99% |
| Pour point, °F. | | −100 |
| Flash point (TOC), °F. | | 270 |
| Specific heat, cal/g/°C. | 20° C. | 0.615 |
| | 100° C. | 0.682 |
| | 150° C. | 0.777 |
| Heat of vaporization, cal/mol | 150° C. | 13,200 |
| | 175° C. | 12,600 |
| | 200° C. | 12,200 |
| | 240° C. | 11,900 |
| Heat of combustion, cal/g. | | 3,396 |
| Viscosity, centistokes | −65° F. | 57.6 |
| | −40° F. | 19.4 |
| | 0° F. | 6.64 |
| | 100° F. | 1.67 |
| | 210° F. | 0.78 |
| Ash | | nil |
| Clarity of 100% material | | clear |
| Suspended matter | | substantially free |

Various modes of carrying out the invention are contemplated as being within the scope of the following claims, particularly pointing out and distinctly claiming the subject matter which is regarded as the invention.

I claim:

1. A passive thermal storage apparatus comprising a closed container, a supercoolable material within said container and adapted to change between liquid and solid states, a continuously operable passive nucleating means secured to the container and located within the container in continuous contact with the supercoolable material, said passive nucleating means being operable with the container stationary in response to slight disturbance of the liquid relative to the nucleating means for continuously biasing the supercoolable material into nucleation and freezing to positively suppress supercooling of material in the liquid state and to release thermal energy, and heat transfer means for transfer of heat to and from the supercoolable material and wherein said nucleating means includes a plurality of sharp pointed rods secured within the container. within the container.

2. A passive thermal storage apparatus comprising a closed container, a supercoolable material within said container and adapted to change between liquid and solid states, a continuously operable passive nucleating means secured to the container and located within the container in continuous contact with the supercoolable material, said passive nucleating means being operable with the container stationary in response to slight disturbance of the liquid relative to the nucleating means for continuously biasing the supercoolable material into nucleation and freezing to positively suppress supercooling of material in the liquid state and to release thermal energy, and heat transfer means for transfer of heat to and from the supercoolable material and wherein said material is a mixture of ethylene carbonate and propylene carbonate.

3. A thermal energy storage apparatus comprising a container, a supercoolable liquid material substantially filling said container means when heated to its melting temperature, a passive nucleating means located within the container in continuous operative engagement with the supercooled liquid operable with the container stationary to initiate nucleation of the liquid and thereby continuously promoting the crystallization and solidification of the supercooled liquid to a solid, said container means having heat transfer means for selective transfer of heat from and to said material, and means coupled to the container means to create a partial and continuous tilting of the container to cause said liquid to flow relative to said nucleating means and thereby enhance said nucleating of the supercooled liquid and wherein said container includes an inner wall surface formed with a substantial plurality of pointed asperities to define said passive nucleating means.

4. The thermal storage apparatus of claim 3 wherein said inner wall surface includes a series of sharp pointed elements.

5. In a thermal storage apparatus for selective and sequential supplying of heat upon demand, comprising a container means, a supercoolable liquid in said container means, a heat exchanger means coupled to the supercoolable liquid in said container means, and a plurality of elongated nucleating elements immersed in and extending through said supercoolable liquid within said container means to continuously tend to cause freezing of said liquid and releasing the heat of fusion to said heat exchanger means, said elements being formed of a bi-metal to create a continuous agitation of the liquid.

6. The thermal storage apparatus of claim 5 wherein each of said elements includes a plurality of longitudinally extended and interconnected coils, said coil expanding and contracting with changes in the temperature of said supercoolable liquid.

7. In a thermal exchange apparatus for selective and sequential conduction of confined space air upon demand, comprising a container, a supercoolable liquid in said container, said liquid including a mixture of at least two supercoolable materials to establish a selected freezing point above the ambient nighttime air, a heat exchanger means coupled to the supercoolable liquid in said container means, a plurality of essentially passive nucleating elements within the container in contact with said supercoolable liquid within said container and operable independently of movement of the container to continuously initiate nucleation of the liquid and freezing of said liquid and releasing the heat of fusion.

8. The thermal storage apparatus of claim 7 wherein said liquid is a mixture of ethylene carbonate and propylene carbonate.

9. In a thermal exchange apparatus for selective and sequential conditioning confined space air upon demand, comprising a container means, a supercoolable liquid in said container means, a heating source, said liquid including a mixture of at least two supercoolable materials to establish a selected melting temperature below the source temperature, a heat exchanger means coupled to the supercoolable liquid in said container means, and a plurality of essentially passive nucleating elements within the container in contact with said supercoolable liquid within said container means and operable independently of movement of the container to continuously initiate nucleation of the liquid and freezing of said liquid and releasing the heat of fusion.

10. The thermal storage apparatus of claim 9 wherein said liquid is a mixture of ethylene carbonate and propylene carbonate.

11. A passive thermal storage apparatus comprising a closed container, a supercoolable material within said container and adapted to change between liquid and solid states, a continuously operable passive nucleating means secured to the container and located within the container in continuous contact with the supercoolable material, said passive nucleating means being operable with the container stationary in response to slight disturbance of the liquid relative to the nucleating means for continuously biasing the supercoolable material into nucleation and freezing to positively suppress supercooling of material in the liquid state and to release thermal energy, and heat transfer means for transfer of heat to and from the supercoolable material and wherein said supercoolable material is an organic liquid which inherently supercools.

12. The thermal storage apparatus of claim 11 wherein said supercoolable material is ethylene carbonate.

13. The thermal storage apparatus of claim 11 wherein said supercoolable material is propylene carbonate.

14. The thermal storage apparatus of claim 11 wherein said supercoolable material is ethylene trithiocarbonate.

15. The thermal storage apparatus of claim 11 wherein said supercoolable material is phenyl sulfoxide.

16. The thermal storage apparatus of claim 11 wherein said supercoolable material is benzophenone.

* * * * *

UNITED STATES PATENT AND TRADEMARK OFFICE
CERTIFICATE OF CORRECTION

PATENT NO.   : 4,258,696
DATED        : March 31, 1981
INVENTOR(S)  : Raj Gopal

It is certified that error appears in the above-identified patent and that said Letters Patent are hereby corrected as shown below:

| | | |
|---|---|---|
| Column 2, | Line 21, | After "have" cancel "limitedpractical" and substitute therefore --- limited practical ---; |
| Column 4, | Line 51, | After "point" cancel "of" and substitute therefore --- or ---; |
| Column 8, | Table 1*, | Under "SI Units" cancel "35.4°C." and substitute therefore --- 36.4°C. ---; |
| Column 9, | Table 1*, | At end of Table after "Various portions of Table 1" insert --- and Figure 8 ---. |
| Column 9, | Table 2, | After "Suspended matter" insert on next line --- Odor ---; and after "substantially free" insert on next line --- mild, not objectionable ---; |
| Column 10, | Line 37, | After "container." cancel second occurance "within the container.". |

Signed and Sealed this

First Day of December 1981

[SEAL]

Attest:

Attesting Officer

GERALD J. MOSSINGHOFF
Commissioner of Patents and Trademarks